United States Patent [19]

Richardson

[11] Patent Number: 5,996,334
[45] Date of Patent: Dec. 7, 1999

[54] GAS TURBINE ENGINE HAVING AN EXTERNAL CENTRAL FRAME

[75] Inventor: Donald G. Richardson, Greenbank, Wash.

[73] Assignee: Solar Turbines, San Diego, Calif.

[21] Appl. No.: 08/939,370

[22] Filed: Sep. 29, 1997

[51] Int. Cl.[6] ........................................... F02C 7/10
[52] U.S. Cl. ............................. 60/39.31; 60/39.511
[58] Field of Search ........................... 60/39.31, 39.511, 60/39.512; 244/54; 248/554, 555

[56] References Cited

U.S. PATENT DOCUMENTS

| | | | |
|---|---|---|---|
| 2,529,958 | 11/1950 | Owner et al. | 60/39.31 |
| 2,632,997 | 3/1953 | Howard et al. | 60/39.31 |
| 2,738,647 | 3/1956 | Hill | 60/39.31 |
| 2,821,067 | 1/1958 | Hill | 60/39.511 |

*Primary Examiner*—Louis J. Casaregola
*Attorney, Agent, or Firm*—Larry G. Cain

[57] ABSTRACT

Present gas turbine engines fail to effectively and efficiently position and locate the components making up the engine to more effectively improve engine cost, serviceability and efficiency. The present gas turbine engine utilizes an external central frame which enhances engine cost, serviceability and efficiency. For example, a front plate structure of the external central frame is removably attached to a combustor section, a rear plate structure of the external central frame is removably attached to a compressor section and a plurality of elongate tie members extend between the front plate structure and the rear plate structure. Thus, the external central frame provides a cost savings by simplifying the structure design and eliminating the need for high stress and high temperature capability materials of a portion of the components of the gas turbine engine, reduces and may eliminates the need for thermal shields and insulation by separating the hot flow path from the engine components, and reduces the complexity of serviceability.

9 Claims, 3 Drawing Sheets

Fig_2_

GAS TURBINE ENGINE HAVING AN EXTERNAL CENTRAL FRAME

TECHNICAL FIELD

This invention relates generally to a gas turbine engine and more particularly to an external central frame interconnecting components of the turbine engine.

BACKGROUND ART

Conventional gas turbine engines utilize the structure of the components to form a unitary design and the components structure acts as a unitary frame. When using the component structure for the frame, physical and structural compromises must be made. For example, heat within causes thermal growth and stress, structural integrity of supporting components during field service becomes a necessity and service accessibility become critical factors during design analysis and manufacturing considerations.

An example of such an engine configuration can be found in U.S. Pat. No. 3,507,115 issued to L. R. Wisoka on Apr. 21, 1970. The engine configuration disclosed in the Wisoka patent includes a generally conventional alignment including a central axis having an inlet end centered thereon, an axial compressor aligned about the central axis, a recuperator radially spaced from the central axis and a port interconnecting the compressor with the recuperator. Positioned radially inward of the recuperator and radially outward of the central axis is a combustion chamber, and positioned radially inward of the combustion chamber and centered upon the central axis is a turbine. The engine configuration includes a unitary housing having the above components positioned therein in heat generating relationship therewith and structurally supporting the components in a conventional manner.

The position and location of critical components influences servicing time and costs. For example, in many existing gas turbine engines the primary components requiring service, such as the combustor, first stage nozzle and turbine, are positioned in undesirable locations and form a portion of the supporting structure. This results in extensive disassembly during field servicing and replacement of parts.

The present invention is directed to overcome one or more of the problems as set forth above.

DISCLOSURE OF THE INVENTION

In one aspect of the invention, a gas turbine engine defines a central axis and has a front and a rear. The gas turbine engine is comprised of the following components. A compressor section is positioned near the rear of the gas turbine engine and is centered about the central axis. A turbine section is positioned intermediate the compressor section and the front of the gas turbine engine and is centered about the central axis. The turbine section is operatively connected to the compressor section. A combustor section is positioned intermediate the turbine section and the front of the gas turbine engine and is operatively connected to the turbine section. An external central frame has a front plate structure and a rear plate structure fixedly attached to a plurality of elongate structural tie members. And, the front plate structure of the external central frame is connected to the combustor section and a portion of the turbine section, and the rear plate structure is connected to the compressor section and a portion of the turbine section.

In another aspect of the invention, an external central frame is adapted to structurally support components of a gas turbine engine. The external central frame is comprised of a front plate structure; a rear plate structure being spaced from the front plate structure and a plurality of elongate structural tie members connected to each of the front plate structure and the rear plate structure.

BEST MODE FOR CARRYING OUT THE INVENTION

Figure 1:
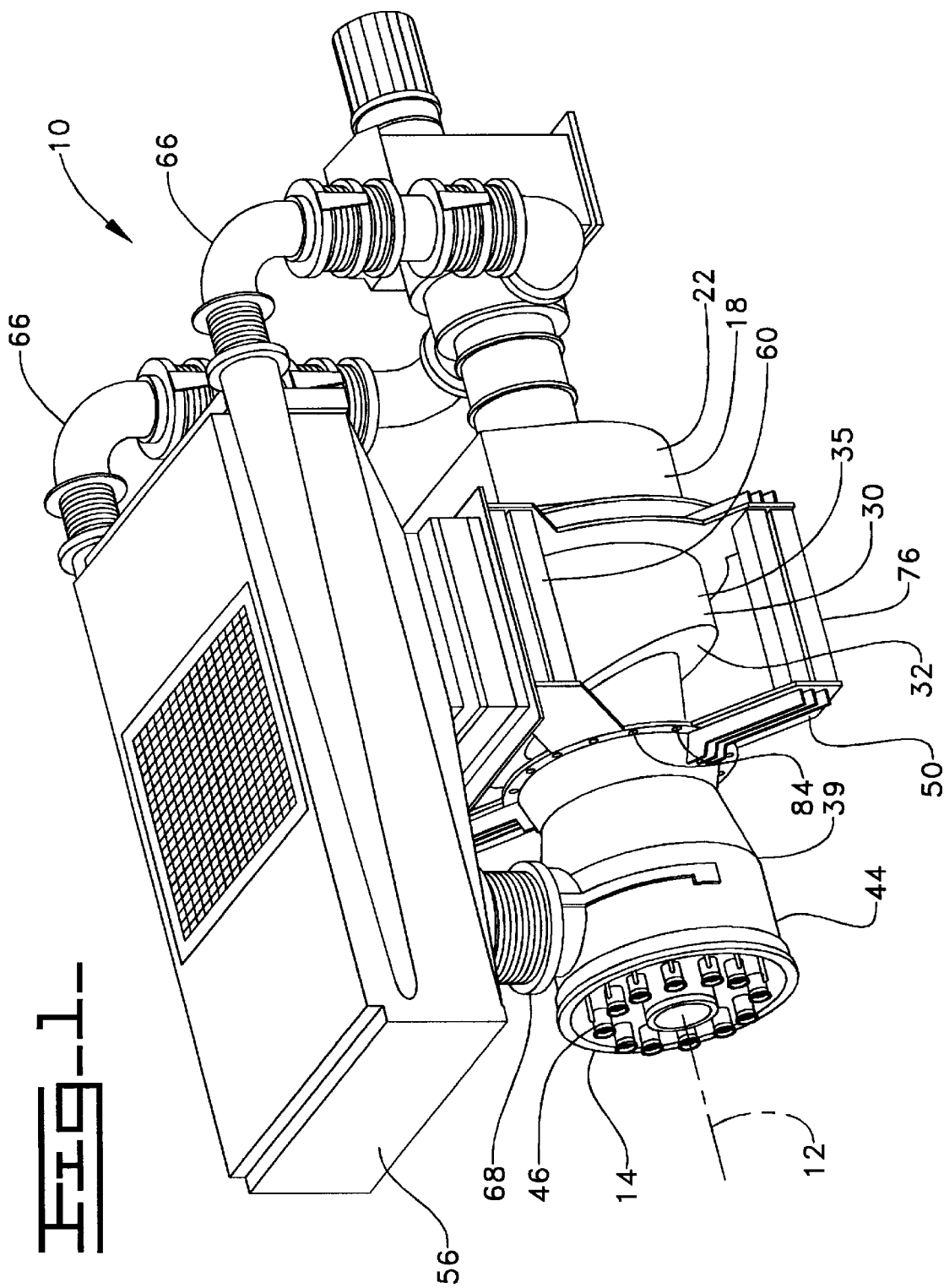
FIG. 1 is a pictorial view of a gas turbine engine embodying the present invention.

Referring to FIG. 1, a gas turbine engine 10 is shown. The gas turbine engine 10 defines a central axis 12, a front 14 and a rear 16. Interposed the front 14 and the rear 16 of the gas turbine engine 10 are a compressor section 18 having a plurality of housings 22 with a plurality of compressor components therein and a turbine section 30 having a plurality of housings 32 with a plurality of turbine components, such as a thrust bearing, therein being operatively connected to the compressor section 18. A portion of the plurality of housings 32 has a flange 33 thereon in which a plurality of attaching holes, not shown, are defined therein. The turbine section 30 further includes a turbine exhaust collector 35, a turbine rotor bearing support and a turbine housing extension having a plurality of attaching holes therein, which are not shown. A combustor section 39 defines an annular combustor being operatively connected to the turbine section 30. A combustor housing 44 of the combustor section 39 has plurality of combustor components therein including a plurality of fuel injectors 46 positioned therein communicating with the annular combustor. The plurality of fuel injectors 46 communicate a combustible fuel, not shown, to the combustor section 39. An external central frame 50 interconnects the plurality of housings 22 of the compressor section 18, the plurality of housings 32 of the turbine section 30 and the housing 44 of the combustor section 39. In this application, a primary surface recuperator 56 defines a plurality of donor passages having an inlet portion 60 operatively connected to the turbine section 30. A donor fluid exits the turbine section 30 and passes through the plurality of donor passages in the recuperator 56 prior to exiting the recuperator 56. The recuperator 56 further defines a plurality of recipient passages having a inlet end 66 and an outlet end 68. A recipient fluid exits the compressor section 18 and operatively passes through the plurality of recipient passages and operatively enters into the combustor housing 44.

As an alternative, the compressor section 18 could include either an axial or a radial compressor. Furthermore, the turbine section 30 could include either an axial or a radial turbine or a single turbine or a plurality of turbine stages. Additionally, the combustor section 39 could include either an annular or a single can combustor or a plurality of can combustors. And, the gas turbine engine 10 could be void of the recuperator 56 without changing the essence of the invention.

Figure 2:
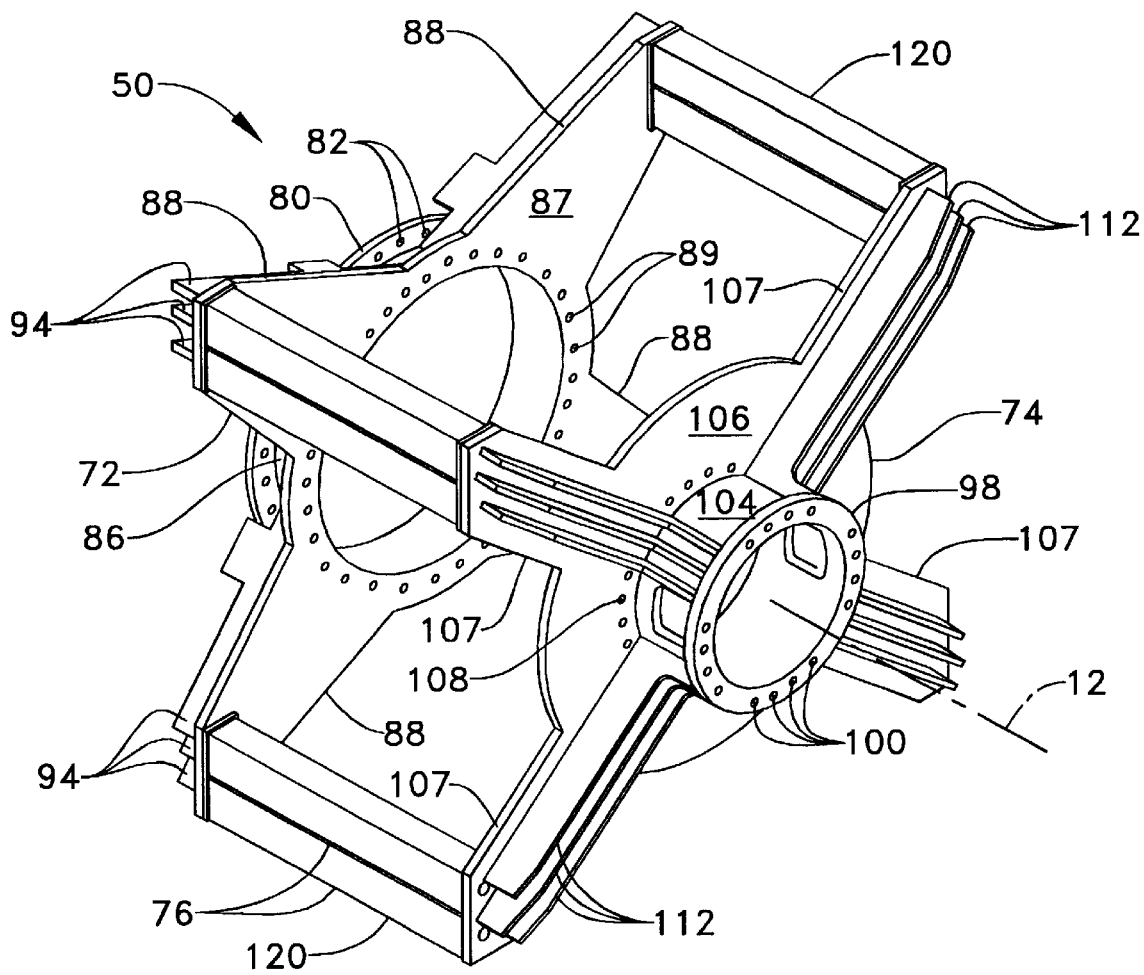
FIG. 2 is a pictorial view of a gas turbine engine external central frame.
Figure 3:
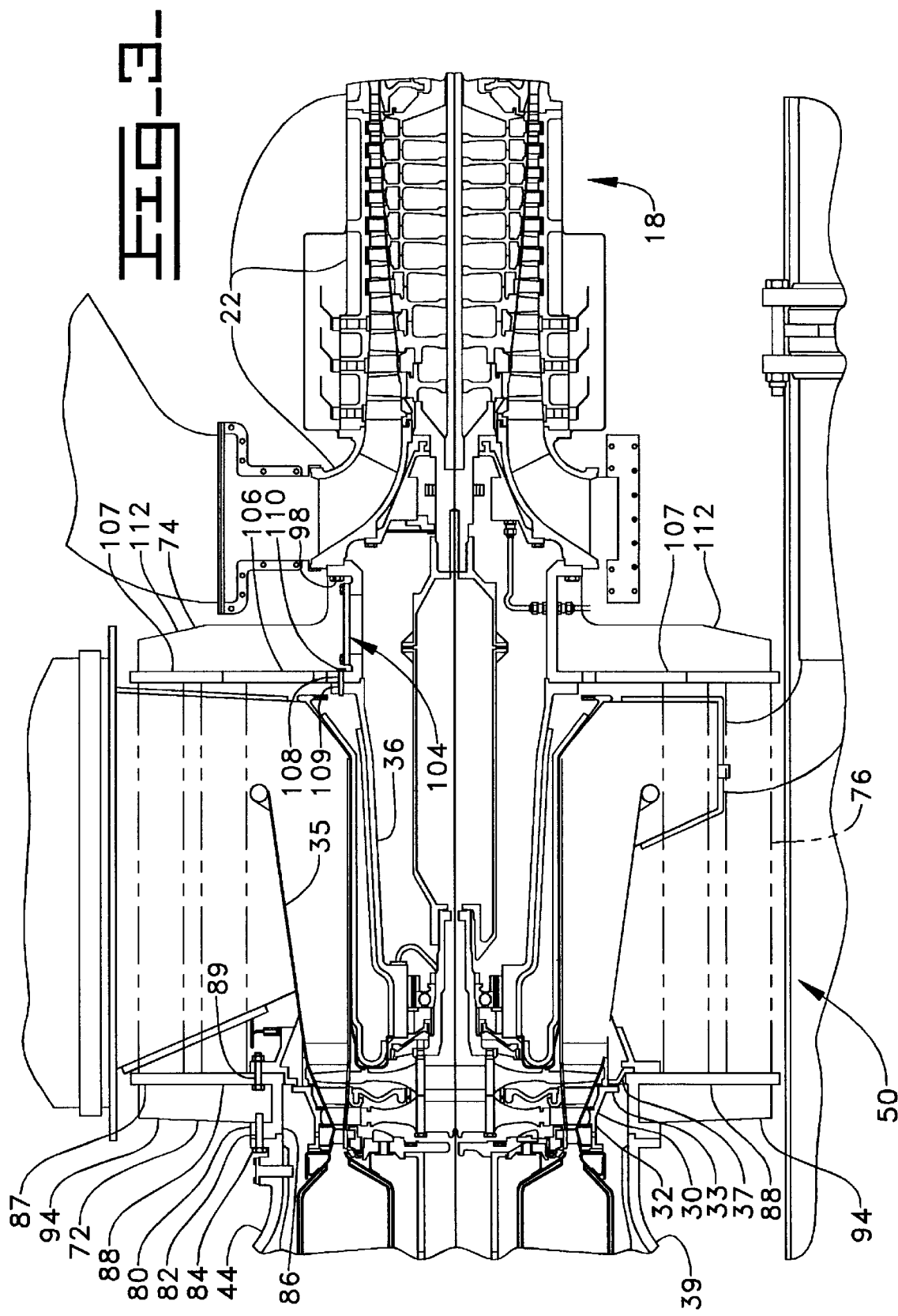
FIG. 3 is a cross sectional view of a gas turbine engine embodying the present invention.

As further shown in FIGS. 2 and 3, the external central frame 50 structurally extends between the combustor housing 44 and the plurality of housings 22 of the compressor section 18. The external central frame 50 includes a front plate structure 72 being connected to each of the turbine exhaust collector 35 and the combustor housing 44, and a rear plate structure 74 being connected to each of the turbine rotor bearing support 36 and the plurality of housings 22 of the compressor section 18. Extending between the front plate structure 72 and the rear plate structure 74 is a plurality of elongate structural tie members 76. The turbine housing extension 37 is captured between the front plate structure 72 and the turbine exhaust collector 35.

In this application, the front plate structure 72 is a weldment but as an alternative could be a casting. The front plate structure 72 includes a flange 80 having a plurality of mounting holes 82 therein corresponding to a plurality of attachment holes 84 in the combustor housing 44. Extending axially from the flange 80 a preestablished distance is a cylindrical portion 86 being attached to the flange 80 at one end. The other end of the cylindrical portion 86 is attached to a flat plate portion 87 which define a plurality of radial extensions 88, which in this application includes four radial extensions 88. The flat plate portion 87 has a plurality of mounting holes 89 positioned therein which correspond to a plurality of attachment holes in the turbine exhaust collector 35. A first plurality of gussets 94 are individually attached between the flange 80, the cylindrical portion 86, flat plate portion 87 and the plurality of radial extensions 88.

In this application, the rear plate structure 74 is a weldment but as an alternative could be a casting. The rear plate structure 74 includes a flange 98 having a plurality of mounting holes 100 therein corresponding to a plurality of attachment holes, not shown, in the plurality of housings 22 of the compressor section 18. Extending axially from the flange 98 a preestablished distance is a cylindrical portion 104 being attached to the flange 98 at one end. The other end of the cylindrical portion 104 is attached to a flat plate portion 106 which has a plurality of radial extensions 107, which in this application includes four radial extensions 107. The flat plate portion 106 has a plurality of mounting holes 108 positioned therein which correspond to a plurality of attachment holes 109 in the turbine rotor bearing support 36 and have a plurality of fasteners 110 positioned therein. A second plurality of gussets 112 are individually attached between the flange 98, the cylindrical portion 104, flat plate portion 106 and the plurality of radial extensions 107.

Each of the plurality of elongate structural tie members 76, in this application, is defined by a tubular member 120 having a box or square configuration. As and alternative, each of the plurality of elongate structural tie members 76 could be of a circular or another configuration without changing the jest of the invention. In this application, each of the plurality of elongate tie members 76 is fixedly attached to each of the front plate structure 72 and the rear plate structure 74, such as by welding. As an alternative, a mechanical attachment system such as a plurality of fasteners could be used without changing the jest of the invention.

Other aspects, objects and advantages of this invention can be obtained from a study of the drawings, the disclosure and the appended claims.

INDUSTRIAL APPLICABILITY

As best shown in FIGS. 1, 2 and 3, the recuperated gas turbine engine 10 is assembled. For example, the compressor section 18 is subassembled within the plurality of housings 22 of the compressor section 18 on the central axis 12. The turbine section 30 is subassembled in the plurality of housings 32 of the turbine section 30 on the central axis 12. And, the combustor section 39 is subassembled in the housing 44 on the central axis 12. Furthermore, the external central frame 50 is subassembled by welding the plurality of elongate structural tie members 76, the front plate structure 72 and the rear plate structure 74 one to the other. The external central frame 50 is assembled to each of the turbine exhaust collector 35 and the turbine housing extension 37. The plurality of mounting holes 100 in the flange 98 of the rear plate structure 74 is aligned with the plurality of attachment holes 102 in the plurality of housings 22 of the compressor section 18 and are attached thereto. Thus, the external central frame 50 is connected to and axially aligned with the compressor section 18 and the central axis 12. The plurality of attachment holes 109 in the turbine rotor bearing support 36 are aligned with the plurality of mounting holes 108 in the flat plate portion 106 of the rear plate structure 74. And, the plurality of fasteners 110 attach the components together. Thus, the turbine rotor bearing support 36 and consequently the turbine rotor are attached and axially aligned with the compressor section 18 and the central axis 12. The plurality of attachment holes in the respective flange 33 of the respective one of the plurality of housings 32 of the turbine section 30 and the plurality of attaching holes in the turbine housing extension 37 are aligned and fastened together. Thus, the turbine section 30 and the compressor section 18 are axially aligned about the central axis 12. The plurality of mounting holes 82 in the flange 80 of the front plate structure 72 are aligned with the plurality of attachment holes 84 in the combustor housing 44 and are attached thereto. Thus, the combustor section 39 and the turbine section 30 are axially aligned with the central axis 12.

The compressor section 18, the combustor section 39 and the turbine section 30 are rigidly secured or attached structurally by the external central frame 50. Additionally, the turbine rotor bearing housing 36, the plurality of housings 32 of the turbine section 30, and the combustor housing 44 are constructed of a material having a lower stress characteristic and/or temperature capability than are the housings of conventional gas turbine engines. The external central frame 50 provides a carrier for the loads produced within the gas turbine engine 10. The external central frame 50 carries the primary load between the components of the turbine section 30, such as the thrust bearing, and the compressor section 18. The external central frame 50 simplifies the separation of the gas turbine components and separates the lubricating and cooling oil compartments from the hot flow path. With the external central frame 50, the service accessibility of the gas turbine engine 10 is enhanced since the external central frame 50 maintains the structural integrity as the modular construction, compressor section 18, turbine section 30 and combustor section 44, are removed.

Thus, the external central frame 50 provides a cost savings, reduces and may eliminate the need for thermal shields and insulation, and simplifies the component design.

Other aspects, objects and advantages will become apparent from a study of the specification, drawings and appended claims.

I claim:
1. A gas turbine engine defining a central axis and having a front and a rear; comprising:
  a compressor section being positioned near the rear of said gas turbine engine and being centered about said central axis;
  a turbine section being positioned intermediate said compressor section and said front of said gas turbine engine and being centered about said central axis, said turbine section being operatively connected to said compressor section;

a combustor section being positioned intermediate said turbine section and said front of said gas turbine engine and being operatively connected to said turbine section;

an external central frame having a front plate structure and a rear plate structure being fixedly attached to a plurality of elongate structural tie members; and said front plate structure of said external central frame being connected to said combustor section and a portion of said turbine section and said rear plate structure being connected to said compressor section and a portion of said turbine section.

2. The gas turbine engine of claim 1 further including a recuperator being operatively connected to said compressor section and to said combustor section.

3. The gas turbine engine of claim 2 wherein said recuperator is of a primary surface configuration.

4. The gas turbine engine of claim 1 further including a plurality of gussets being structurally positioned and fixedly attached to said front plate structure of said external central frame.

5. The gas turbine engine of claim 4 further including a plurality of gussets being structurally positioned and fixedly attached to said rear plate structure of said external central frame.

6. The gas turbine engine of claim 1 wherein said combustor section includes a housing having a plurality of components positioned therein, said housing being connected to said external central frame and said plurality of components being removably attached within said housing.

7. The gas turbine engine of claim 6 wherein said housing being removably attached to said external central frame.

8. The gas turbine engine of claim 1 wherein said turbine section includes a plurality of housings having a plurality of components positioned therein, said plurality of housings and said plurality of components being removably attached to said external central frame.

9. The gas turbine engine of claim 1 wherein said rear plate structure is removably attached to said compressor section.

* * * * *

UNITED STATES PATENT AND TRADEMARK OFFICE
CERTIFICATE OF CORRECTION

PATENT NO. : 5,996,334
DATED : 12/07/1999
INVENTOR(S) : Donald G. Richardson

It is certified that error appears in the above-identified patent and that said Letters Patent is hereby corrected as shown below:

Column 1, at line 6, in a separate paragraph after the title, "GAS TURBINE ENGINE HAVING AN EXTERNAL FRAME" forming a new paragraph insert --The Government has the rights in this invention pursuant to Contract No. DE-FC21-95MC31173 awarded by the Department of Energy.--

Signed and Sealed this

Twelfth Day of September, 2000

Attest:

Q. TODD DICKINSON

*Attesting Officer*    *Director of Patents and Trademarks*